United States Patent
Huang

(10) Patent No.: US 10,164,245 B2
(45) Date of Patent: Dec. 25, 2018

(54) HIGH PERFORMANCE SILICON ELECTRODES HAVING IMPROVED INTERFACIAL ADHESION BETWEEN BINDER, SILICON AND CONDUCTIVE PARTICLES

(71) Applicant: GM Global Technology Operations LLC, Detroit, MI (US)

(72) Inventor: Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 15/269,470

(22) Filed: Sep. 19, 2016

(65) Prior Publication Data
US 2018/0083268 A1    Mar. 22, 2018

(51) Int. Cl.
*H01M 4/04*    (2006.01)
*H01M 4/36*    (2006.01)
(Continued)

(52) U.S. Cl.
CPC .......... *H01M 4/364* (2013.01); *H01M 4/133* (2013.01); *H01M 4/134* (2013.01);
(Continued)

(58) Field of Classification Search
CPC ...... H01M 4/364; H01M 4/625; H01M 4/622; H01M 4/386; H01M 4/60; H01M 2004/021; H01M 2004/027
See application file for complete search history.

(56) References Cited

U.S. PATENT DOCUMENTS 6,451,487 B1    9/2002    Besner et al.
7,018,607 B2    3/2006    Nazri et al.
(Continued)

FOREIGN PATENT DOCUMENTS

CN    101107746 A    1/2008
CN    101385163 A    3/2009
(Continued)

OTHER PUBLICATIONS

Zheng Long Xu et al.; "Electrospun Carbon Nanofiber Anodes Containing Monodispersed Si Nanoparticles and Graphene Oxide with Exceptional High Rate Capacities"; Nano Energy, vol. 6; May, 2014; pp. 27-35.
(Continued)

*Primary Examiner* — Cynthia K Walls
(74) *Attorney, Agent, or Firm* — Harness, Dickey & Pierce, P.L.C.

(57) ABSTRACT

Methods for making a negative electrode material for use in an electrochemical cell, like a lithium ion battery, are provided. The electroactive material includes a functionalized surface having a grafted reactive group (e.g., an amino group, a carboxyl group, an anhydride group, and the like). The electrically conductive material includes a functionalized surface having a grafted reactive group (e.g., an amino group, a carboxyl group, and the like). The functionalized electroactive material and the functionalized electrically conductive material is admixed and reacted with at least one binder precursor having a reactive group (e.g., an amino group, an anhydride group, and the like). A porous solid electrode material is thus formed. Negative electrodes are also provided, which provide significant performance benefits and reduce the issues associated with capacity fade, diminished electrochemical cell performance, cracking, and
(Continued)

short lifespan associated with conventional silicon anode materials.

16 Claims, 3 Drawing Sheets

(51) Int. Cl.
| | |
|---|---|
| *H01M 4/38* | (2006.01) |
| *H01M 4/60* | (2006.01) |
| *H01M 4/62* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 4/587* | (2010.01) |
| *H01M 4/02* | (2006.01) |
| *H01M 10/052* | (2010.01) |

(52) U.S. Cl.
CPC ....... *H01M 4/1393* (2013.01); *H01M 4/1395* (2013.01); *H01M 4/386* (2013.01); *H01M 4/587* (2013.01); *H01M 4/60* (2013.01); *H01M 4/622* (2013.01); *H01M 4/624* (2013.01); *H01M 4/625* (2013.01); *H01M 10/052* (2013.01); *H01M 2004/021* (2013.01); *H01M 2004/027* (2013.01)

(56) References Cited

U.S. PATENT DOCUMENTS

| | | | |
|---|---|---|---|
| 7,285,260 | B2 | 10/2007 | Armand et al. |
| 7,457,018 | B2 | 11/2008 | Armand et al. |
| 7,491,467 | B2 | 2/2009 | Satoh et al. |
| 7,651,732 | B2 | 1/2010 | Cheng et al. |
| 7,722,994 | B2 | 5/2010 | Halalay |
| 7,736,805 | B2 | 6/2010 | Nazri et al. |
| 8,076,027 | B2 | 12/2011 | Honda et al. |
| 8,101,152 | B1 | 1/2012 | Halalay et al. |
| 8,148,455 | B2 | 4/2012 | Posudievsky et al. |
| 8,247,116 | B2 | 8/2012 | He et al. |
| 8,309,644 | B1 | 11/2012 | Huang |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,455,140 | B1 | 6/2013 | Huang et al. |
| 8,460,591 | B2 | 6/2013 | Huang et al. |
| 8,460,829 | B1 | 6/2013 | Huang et al. |
| 8,470,468 | B2 | 6/2013 | Xiao et al. |
| 8,470,898 | B2 | 6/2013 | Huang |
| 8,641,860 | B2 | 2/2014 | Flores et al. |
| 8,642,201 | B2 | 2/2014 | Cheng et al. |
| 8,658,295 | B2 | 2/2014 | Cheng et al. |
| 8,679,680 | B2 | 3/2014 | Vanimisetti et al. |
| 8,753,543 | B2 | 6/2014 | Zhamu et al. |
| 8,828,481 | B2 | 9/2014 | Burton et al. |
| 8,835,056 | B2 | 9/2014 | Xiao et al. |
| 8,974,946 | B2 | 3/2015 | Cai et al. |
| 8,999,584 | B2 | 4/2015 | Jiang et al. |
| 9,012,075 | B2 | 4/2015 | Verbrugge et al. |
| 9,034,519 | B2 | 5/2015 | Xiao et al. |
| 9,059,451 | B2 | 6/2015 | Xiao et al. |
| 9,093,705 | B2 | 7/2015 | Xiao et al. |
| 9,123,939 | B2 | 9/2015 | Xiao et al. |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,356,281 | B2 | 5/2016 | Verbrugge et al. |
| 9,362,551 | B2 | 6/2016 | Sachdev et al. |
| 9,362,552 | B2 | 6/2016 | Sohn et al. |
| 9,379,374 | B2 | 6/2016 | Liu et al. |
| 9,564,639 | B2 | 2/2017 | Huang |
| 2006/0147797 | A1 | 7/2006 | Wu et al. |
| 2007/0202411 | A1 | 8/2007 | Kim et al. |
| 2007/0238023 | A1 | 10/2007 | Gorshkov et al. |
| 2007/0275302 | A1 | 11/2007 | Sotowa et al. |
| 2008/0063939 | A1 | 3/2008 | Ryu et al. |
| 2008/0226987 | A1 | 9/2008 | Yumoto et al. |
| 2008/0261116 | A1 | 10/2008 | Burton et al. |
| 2009/0111031 | A1 | 4/2009 | Hirose et al. |
| 2009/0136415 | A1 | 5/2009 | Gorshkov et al. |
| 2009/0140742 | A1 | 6/2009 | Koch et al. |
| 2009/0155697 | A1 | 6/2009 | Park et al. |
| 2009/0253042 | A1 | 10/2009 | Sun et al. |
| 2009/0286157 | A1 | 11/2009 | Chen et al. |
| 2009/0325071 | A1 | 12/2009 | Verbrugge et al. |
| 2010/0079145 | A1 | 4/2010 | Meisner et al. |
| 2010/0143790 | A1 | 6/2010 | Inagaki et al. |
| 2010/0203392 | A1 | 8/2010 | Yamada et al. |
| 2010/0272612 | A1 | 10/2010 | Ramamurthy |
| 2010/0330421 | A1 | 12/2010 | Cui et al. |
| 2011/0017528 | A1 | 1/2011 | Kumar et al. |
| 2011/0027649 | A1 | 2/2011 | Abe |
| 2011/0037436 | A1 | 2/2011 | Seethaler et al. |
| 2011/0044886 | A1 | 2/2011 | Gorshkov et al. |
| 2011/0086249 | A1 | 4/2011 | Timmons |
| 2011/0086294 | A1 | 4/2011 | Xiao et al. |
| 2011/0111294 | A1 | 5/2011 | Lopez et al. |
| 2011/0111308 | A1 | 5/2011 | Halalay et al. |
| 2011/0121225 | A1 | 5/2011 | Posudievsky et al. |
| 2011/0151333 | A1 | 6/2011 | Halalay et al. |
| 2011/0165459 | A1 | 7/2011 | Halalay et al. |
| 2011/0166811 | A1 | 7/2011 | Koch et al. |
| 2011/0189577 | A1 | 8/2011 | Chung et al. |
| 2011/0200781 | A1 | 8/2011 | Sowul et al. |
| 2011/0200863 | A1 | 8/2011 | Xiao et al. |
| 2011/0224928 | A1 | 9/2011 | Lin et al. |
| 2011/0250478 | A1 | 10/2011 | Timmons et al. |
| 2011/0274962 | A1 | 11/2011 | Inagaki et al. |
| 2012/0003533 | A1 | 1/2012 | Dahn et al. |
| 2012/0086457 | A1 | 4/2012 | Meisner et al. |
| 2012/0100403 | A1 | 4/2012 | Wang et al. |
| 2012/0101674 | A1 | 4/2012 | Wang et al. |
| 2012/0105068 | A1 | 5/2012 | Wang et al. |
| 2012/0105069 | A1 | 5/2012 | Wang et al. |
| 2012/0109503 | A1 | 5/2012 | Yang et al. |
| 2012/0156568 | A1 | 6/2012 | Kia et al. |
| 2012/0156569 | A1 | 6/2012 | Kia et al. |
| 2012/0161757 | A1 | 6/2012 | Koch et al. |
| 2012/0161776 | A1 | 6/2012 | Koch et al. |
| 2012/0169297 | A1 | 7/2012 | Schaefer et al. |
| 2012/0208087 | A1 | 8/2012 | Yamamoto et al. |
| 2012/0219852 | A1 | 8/2012 | Huang et al. |
| 2012/0227252 | A1 | 9/2012 | Nazri |
| 2012/0229096 | A1 | 9/2012 | Nazri |
| 2012/0231321 | A1 | 9/2012 | Huang et al. |
| 2012/0244390 | A1 | 9/2012 | Cheng et al. |
| 2012/0244418 | A1 | 9/2012 | Cheng et al. |
| 2012/0264017 | A1 | 10/2012 | Nazri et al. |
| 2012/0301790 | A1 | 11/2012 | Xiao et al. |
| 2012/0308853 | A1 | 12/2012 | Vanimisetti et al. |
| 2012/0308872 | A1 | 12/2012 | Huang |
| 2012/0328927 | A1 | 12/2012 | Timmons et al. |
| 2013/0071736 | A1 | 3/2013 | Xiao et al. |
| 2013/0071742 | A1 | 3/2013 | Halalay et al. |
| 2013/0099159 | A1 | 4/2013 | Halalay et al. |
| 2013/0122374 | A1 | 5/2013 | Verbrugge et al. |
| 2013/0131200 | A1 | 5/2013 | Huang |
| 2013/0157125 | A1 | 6/2013 | Sachdev et al. |
| 2013/0175998 | A1 | 7/2013 | Wang et al. |
| 2013/0177804 | A1 | 7/2013 | Verbrugge et al. |
| 2013/0177808 | A1 | 7/2013 | Wang et al. |
| 2013/0183582 | A1 | 7/2013 | Halalay et al. |
| 2013/0189576 | A1 | 7/2013 | Verbrugge et al. |
| 2013/0224602 | A1 | 8/2013 | Huang |
| 2013/0234674 | A1 | 9/2013 | Nazri |
| 2013/0284338 | A1 | 10/2013 | Xiao et al. |
| 2013/0319599 | A1 | 12/2013 | Huang |
| 2013/0323595 | A1 | 12/2013 | Sohn et al. |
| 2014/0011089 | A1 | 1/2014 | Yamada et al. |
| 2014/0023931 | A1 | 1/2014 | Huang |
| 2014/0038024 | A1 | 2/2014 | Huang |

(56) References Cited

U.S. PATENT DOCUMENTS

| | | |
|---|---|---|
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0014890 A1 | 1/2015 | Xiao |
| 2015/0037651 A1 | 2/2015 | Huang |
| 2015/0162602 A1 | 6/2015 | Dadheech et al. |
| 2015/0180023 A1 | 6/2015 | Xiao et al. |
| 2015/0228980 A1 | 8/2015 | Huang |
| 2017/0092950 A1 | 3/2017 | Xiao et al. |

FOREIGN PATENT DOCUMENTS

| | | |
|---|---|---|
| CN | 101728517 A | 6/2010 |
| CN | 101764209 A | 6/2010 |
| CN | 101986442 A | 3/2011 |
| CN | 102306748 A | 1/2012 |
| CN | 103779550 A | 5/2014 |
| CN | 103943819 A | 7/2014 |
| CN | 104701487 A | 6/2015 |
| CN | 107845772 A | 3/2018 |
| DE | 102013220351 A1 | 4/2014 |
| DE | 102014118089 A1 | 6/2015 |
| DE | 102017121250 A1 | 3/2018 |
| FR | 2965408 A1 | 3/2012 |
| WO | WO-2007094635 A1 | 8/2007 |
| WO | WO-2012132396 A1 | 10/2012 |
| WO | WO-2014022986 A1 | 2/2014 |
| WO | WO-2014182281 A1 | 11/2014 |
| WO | WO-2015176241 A1 | 11/2015 |

OTHER PUBLICATIONS

Bai, Ying, et al., "Microstructure and electrochemical performances of LiF-coated spinel $LiMn_2O_4$," Transactions of Nonferrous Metals Society of China, vol. 17, pp. s892-s896 (2007).

Gaines, Linda, et al., "Costs of Lithium-Ion Batteries for Vehicles," Argonne National Laboratory, Center for Transportation Research (May 2000).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Qin, Yan, et al., "Mechanism of LTO Gassing and potential solutions," Argonne National Laboratory Presentation, May 9-13, 2011 (18 pages).

Aurbach, Doron, et al., "Design of electrolyte solutions for Li and Li-ion batteries: a review," Electrochimica Acta, vol. 50, pp. 247-254 (2004)(published online Aug. 3, 2004).

George, Steven M., "Atomic Layer Deposition: An Overview," Chem. Rev., vol. 110, No. 1, pp. 111-131 (2010) (published online Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Leskela, Markku, et al., "Atomic layer deposition (ALD): from precursors to thin film structures," Thin Solid Films, vol. 409, pp. 138-146 (2002).

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2pages).

Ramadass, Premanand, et al., "Mathematical Modeling of SEI Formation in Li-Ion Cell Anodes," 202nd Meeting of the Electrochemical Society—Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Huntsman Corporation, Jeffamine.RTM. ED-2003 Polyetheramine Technical Bulletin, Form 5197-0208 (2007) (2 pages).

Franssila, Sami, Introduction to Microfabrication, Second Ed., p. 53 (2010).

A Second Office Action in Chinese Application No. 201310489603.8 from the State Intellectual Property Office (SIPO) dated May 22, 2016, and correspondence from China Patent Agent (H.K.) summarizing the Second Office Action; 11 pages.

A First Office Action in Chinese Application No. 201310489603.8 from the State Intellectual Property Office (SIPO) dated Jul. 31, 2015, and correspondence from China Patent Agent (H.K.) summarizing the First Office Action; 12 pages.

A First Office Action in Chinese App. No. 201410017174.9 from the State Intellectual Property Office dated Oct. 10, 2015; 12 pages.

A First Office Action in Chinese Application No. 201410750591.4 from the Chinese Patent Office dated Jul. 5, 2016 and correspondence from China Patent Agent (H.K.) summarizing the First Office Action; 9 pages.

Xingcheng Xiao et al.; "Ultrathin Multifunctional Oxide Coatings for Lithium Ion Batteries"; Advanced Materials, vol. 23, No. 34; Jul. 22, 2011; pp. 3911-3915.

Yoon Seok Jung et al.; "Ultrathin Direct Atomic Layer Deposition on Composite Electrodes for Highly Durable and Safe Li-Ion Batteries"; Advanced Materials, vol. 22, No. 19; Apr. 6, 2010; pp. 2172-2176.

A second Office Action in Chinese Application No. 201410017174.9 from the Chinese Patent Office dated Aug. 3, 2016 and correspondence from China Patent Agent (H.K.) summarizing the First Office Action; 15 pages.

HIGH PERFORMANCE SILICON ELECTRODES HAVING IMPROVED INTERFACIAL ADHESION BETWEEN BINDER, SILICON AND CONDUCTIVE PARTICLES

FIELD

The present disclosure relates to high performance silicon-containing electrodes for lithium ion electrochemical devices, where the improved silicon-containing electrodes comprise silicon particles and electrically conductive particles treated for improved and long-term interfacial adhesion with a binder to minimize capacity fade and enhance long-term performance, as well as methods for making and using such improved silicon-containing electrodes.

BACKGROUND

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

In various aspects, an electrode includes an electroactive material. Negative electrodes typically comprise such an electroactive material that is capable of functioning as a lithium host material serving as a negative terminal of a lithium ion battery. Negative electrodes typically include the electroactive lithium host material and another electrically conductive material, such as carbon black particles, as well as one or more polymeric binder materials to hold the lithium host material and electrically conductive particles together.

Typical electroactive materials for forming a negative electrode (e.g., an anode) in a lithium-ion electrochemical cell include lithium-graphite intercalation compounds, lithium-silicon compounds, lithium-tin intercalation compounds, and lithium alloys. While graphite compounds are most common, recently, anode materials with high specific capacity (in comparison with conventional graphite) are of growing interest. For example, silicon has the highest known theoretical charge capacity for lithium, making it one of the most attractive alternatives to graphite as a negative electrode material for rechargeable lithium ion batteries. However, current silicon anode materials suffer from significant drawbacks. Silicon-containing materials experience large volume changes (e.g., volume expansion/contraction) during lithium insertion/extraction. Thus, cracking of the negative electrode (e.g., anode), a decline of electrochemical cyclic performance and large Coulombic charge capacity loss (capacity fade), and extremely limited cycle life are often observed during cycling of conventional silicon-containing electrodes. This diminished performance is believed in large part to be due to the breakdown of physical contact between silicon particles and conductive fillers caused by the large volume changes in the electrode during cycling of lithium ion.

It would be desirable to develop high performance negative electrode materials comprising silicon for use in high power lithium ion batteries, which overcome the current shortcomings that prevent their widespread commercial use, especially in vehicle applications. For long term and effective use, anode materials containing silicon and conductive fillers should be capable of minimal capacity fade and maximized charge capacity for long-term use in lithium ion batteries.

SUMMARY

This section provides a general summary of the disclosure and is not a comprehensive disclosure of its full scope or all of its features.

In certain variations, the present disclosure provides a negative electrode for an electrochemical cell, such as a lithium ion battery. In other variations, the present disclosure contemplates methods of making a negative electrode for an electrochemical cell. In one variation, the method includes admixing an electroactive material including silicon having a first surface functionalized with a first reactive group selected from the group consisting of an amino group, a carboxyl group, an anhydride group and a combination thereof; an electrically conductive material having a second surface functionalized with a second reactive group selected from the group consisting of an amino group, a carboxyl group and a combination thereof; and at least one binder precursor having a third reactive group selected from the group consisting of an amino group, an anhydride group and a combination thereof. Then, the third reactive group on the at least one binder precursor reacts with the first reactive group on the electroactive material and the second reactive group on the electrically conductive material to form a porous solid electrode material. The porous solid electrode material includes a polymeric binder reacted with the electroactive material and the electrically conductive material to form the negative electrode.

In yet other aspects, the present disclosure provides a negative electrode for an electrochemical cell. The negative electrode includes a porous solid electrode material include an electroactive material including silicon having a first functionalized surface having a first reactive group selected from the group consisting of an amino group, a carboxyl group, an anhydride group and a combination thereof; and an electrically conductive material having a second functionalized surface having a second reactive group selected from the group consisting of an amino group, a carboxyl group and a combination thereof. The first functionalized surface and the second functionalized surface are bonded to a polymeric binder including polyimide. Such a binder is formed from at least one binder precursor that has at least a third reactive group including an anhydride group and/or an amino group that can react with the first reactive group and/or the second reactive group. After the reaction, the interfacial adhesion between the electroactive material, the electrically conductive material, and the polymeric binder is strong and improves cycling performance and reduces capacity fade, among other benefits.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
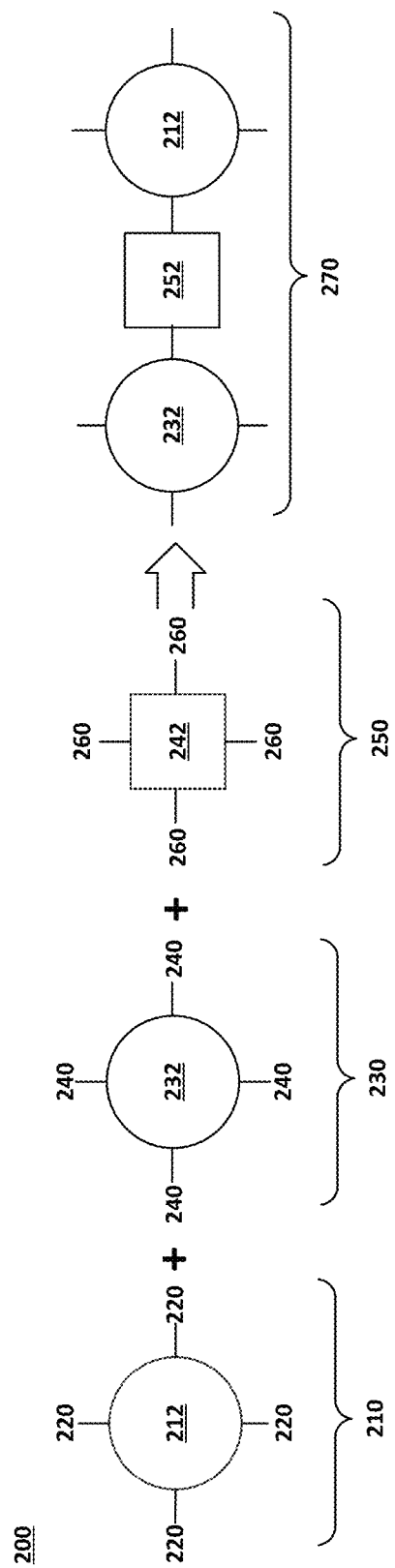
Figure 4:
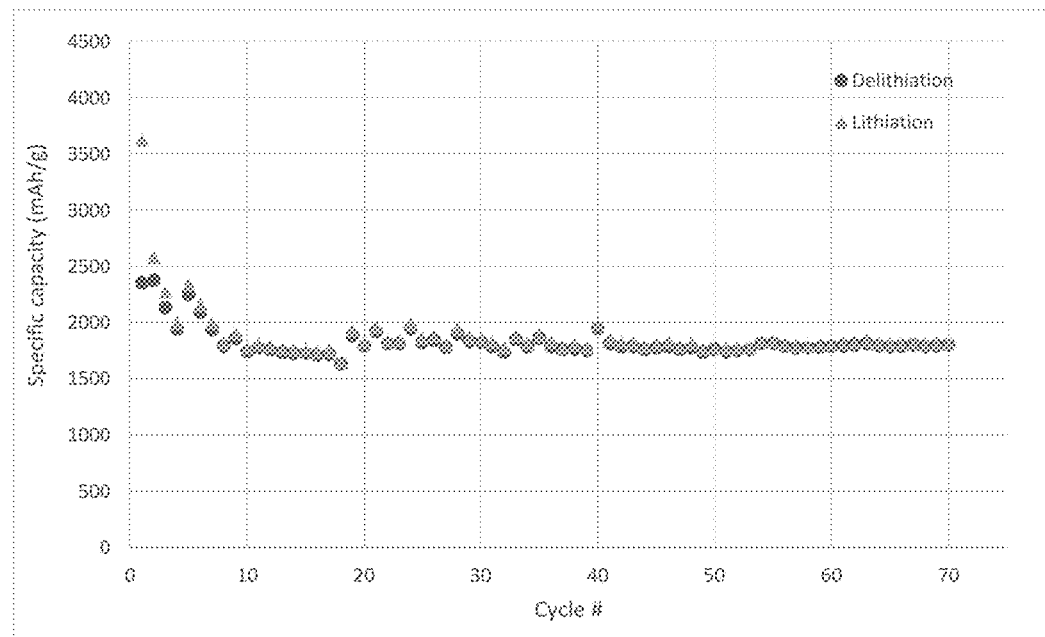

FIG. 3 shows an exemplary reaction between a functionalized electroactive particle, a functionalized electrically conductive particle and a binder precursor that bond together to form a porous electrode including a matrix binder material comprising the electroactive material; and FIG. 4 shows specific capacity of a lithium ion battery having a silicon-containing anode material prepared in accordance with certain aspects of the present teaching over 70 cycles of charging and discharging.

Figure 5:
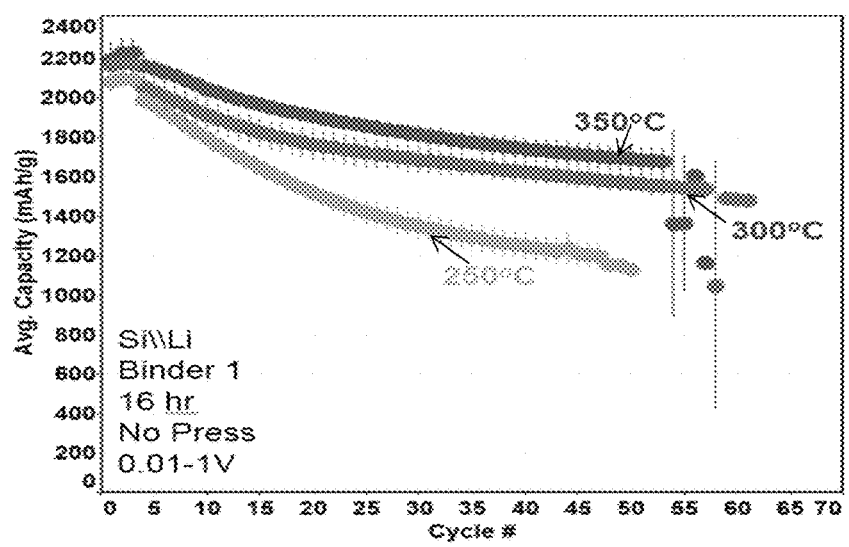

FIG. 5 shows specific capacity of a comparative lithium ion battery having a silicon-containing anode material prepared without functionalizing the surface of the electroactive material and the electrically conductive material.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

The present disclosure pertains to high-performance lithium ion electrochemical cells (e.g., lithium-ion batteries) having improved negative electrodes. In lithium-ion electrochemical cells or batteries, a negative electrode typically includes a lithium insertion material or an alloy host material. As discussed above, conventional electroactive materials for forming a negative electrode or anode include lithium-graphite intercalation compounds, lithium-silicon compounds, lithium-tin intercalation compounds, and lithium alloys. While graphite compounds are most commonly used, certain anode materials with high specific capacity (in comparison with conventional graphite) are of growing interest. Silicon (Si) is an attractive alternative to graphite as an anode material for rechargeable lithium ion batteries due to its high theoretical capacity. However, a large diminished Coulombic charge capacity (capacity fade) is observed during cycling, partially as the result of the breakdown of physical contact between silicon material and conductive fillers caused by the large volume change in the electrode (during lithium ion insertion and deinsertion or lithiation and delithiation). In addition to capacity fade and a decline of electrochemical cyclic performance, the large volume changes (e.g., volume expansion/contraction) of silicon-containing materials during lithium insertion/extraction can result in cracking of the anode and extremely limited cycle life. These challenges, especially capacity fading for silicon-based anodes, have been a barrier to their widespread use in lithium ion batteries.

The present disclosure provides improved electrodes for an electrochemical cell, especially improved high-performance negative electrodes for lithium-ion electrochemical cells. The electrode comprises an electroactive material comprising silicon having a functionalized surface and an electrically conductive material having a functionalized surface. The surface of silicon-containing electroactive materials and the surface of electrically conductive materials may be grafted with a reactive group, such as, but not limited to a carboxyl group, an amino group and/or an anhydride group, through reaction with silanes, oxidizing agents, dianhydride and/or diamines to create the functionalized surfaces. The functionalized surface of the electroactive material comprising silicon and the functionalized surface of the electrically conductive material is thus reacted with and bonded to a binder to form a solid electrode material. The solid electrode material is preferably porous. Such a negative electrode provides significant performance benefits and reduces the issues associated with capacity fade, diminished electrochemical cell performance, cracking, and short lifespan associated with conventional silicon anode materials. The present disclosure further contemplates methods of making such electrodes.

Figure 1:
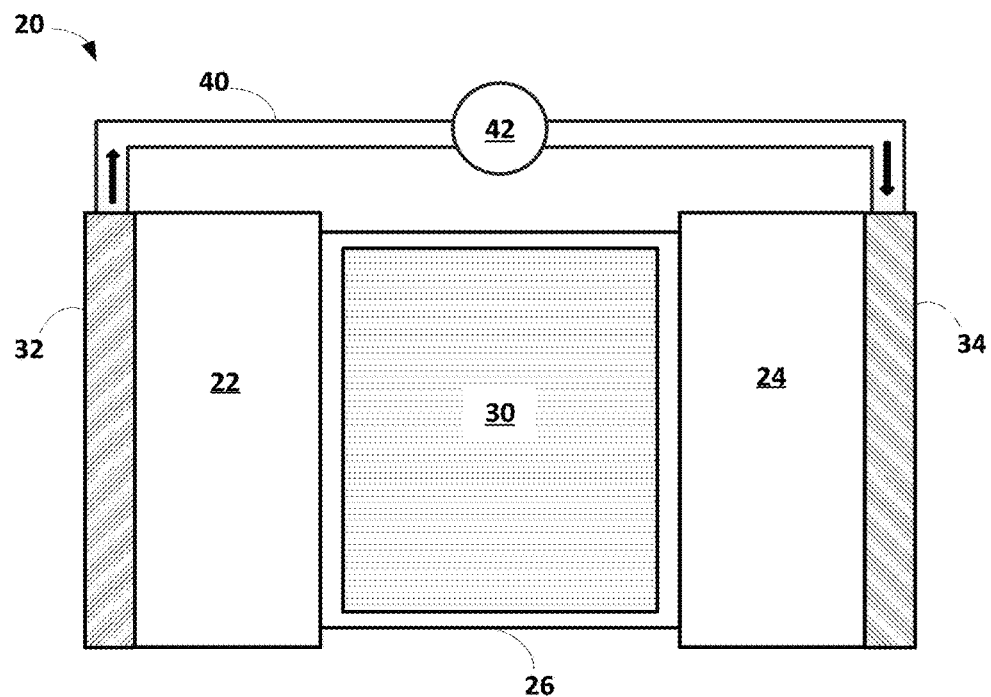
FIG. 1 is a schematic of an exemplary electrochemical battery cell.

As background, electrochemical cells, especially rechargeable lithium ion batteries, may be used in vehicle or other mobile applications. An exemplary and schematic illustration of a lithium ion battery 20 is shown in FIG. 1. Lithium ion battery 20 includes a negative electrode 22, a positive electrode 24, and a separator 30 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the lithium ion battery 20 is diminished.

The lithium ion battery 20 can be charged or re-powered at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge cycle. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator. In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium ion battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. The lithium ion battery 20 may also be connected in series or parallel with other similar lithium ion cells or batteries to produce a greater voltage output and power density if it is required by the load device 42.

Accordingly, the lithium ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium ion battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from a lithium-based active material that can sufficiently undergo lithium intercalation and deintercalation while functioning as the positive terminal of the lithium ion battery 20. The positive electrode 24 may also include a polymeric binder material to structurally fortify the lithium-based active material. One exemplary common class of known materials that can be used to form the positive electrode 24 is layered lithium transitional metal oxides. For example, in certain embodiments, the positive electrode 24 may comprise at least one spinel comprising a transition metal like lithium manganese oxide ($Li_{(1+x)}Mn_{(2-x)}O_4$), where $0 \le x \le 1$, where x is typically less than 0.15, including $LiMn_2O_4$, lithium manganese nickel oxide ($LiMn_{(2-x)}Ni_xO_4$), where $0 \le x \le 1$ (e.g., $LiMn_{1.5}Ni_{0.5}O_4$), lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \le x \le 1$, $0 \le y \le 1$, $0 \le z \le 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $y<1$, and M may be Al, Mn, or the like, other known lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). Such active materials may be intermingled with a conductive filler material, such as carbon black or graphite, and at least one polymeric binder. Active materials can be slurry cast with other components, including binders like polyvinylidene fluoride (PVDF), ethylene propylene diene monomer (EPDM) rubber, polyacrylic acid (PAA) or carboxymethoxyl cellulose (CMC). The positive current collector 34 may be formed from aluminum or any other appropriate electrically conductive material known to those of skill in the art.

Figure 2:
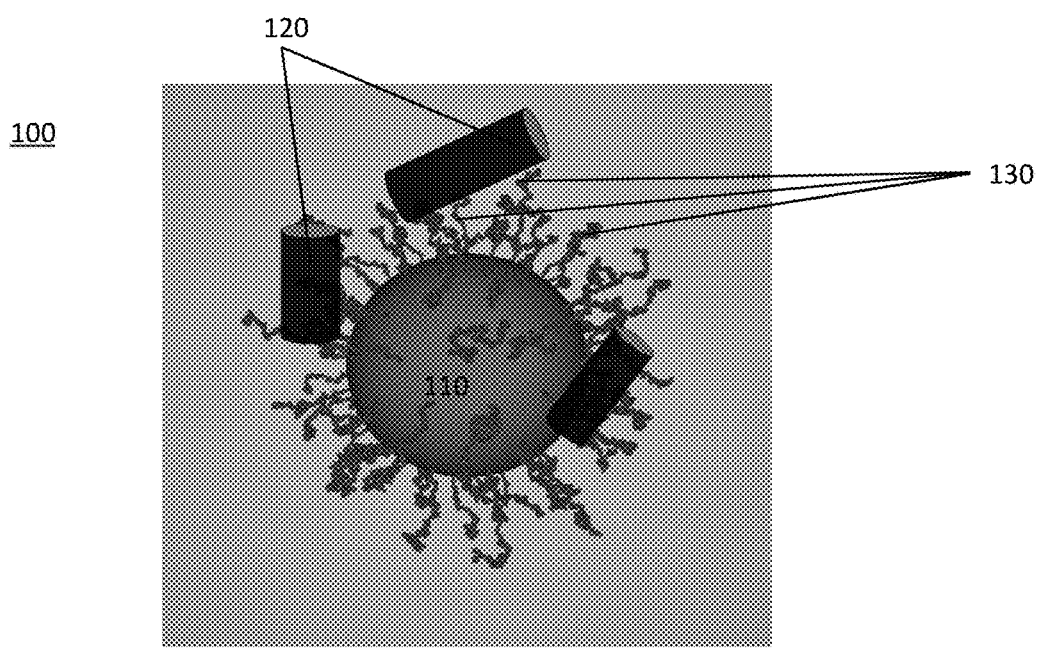
FIG. 2 is a detailed schematic view of an electrode comprising an electroactive material, a conductive filler, and a binder.

In various aspects, the negative electrode 22 includes an electroactive material as a lithium host material capable of functioning as a negative terminal of a lithium ion battery. With reference to FIG. 2, a composite negative electrode 100 includes a lithium host or negative electrode active materials 110 and electrically conductive materials 120, as well as one or more polymeric binder materials 130 to structurally hold the lithium host material together. The electrically conductive materials 120 may be any of those known in the art, including carbon black, carbon fiber, and graphite, by way of non-limiting example. Such negative electrode active materials 110 may be intermingled with the electrically conductive filler material 120 and at least one polymeric binder 130. The polymeric binder 130 is bonded or attached to the negative electrode active materials 110 and electrically conductive filler material 120 in position within the electrode. The polymeric binder 130 fulfills multiple roles in an electrode like 100, including providing: (i) the electronic and ionic conductivities of the composite electrode, (ii) the electrode integrity, e.g., the integrity of the electrode and its components, as well as its adhesion with the current collector, and (iii) formation of solid electrolyte interphase (SEI), which plays an important role as the kinetics of lithium intercalation is predominantly determined by the SEI.

Many lithium-ion batteries can suffer from capacity fade attributable to many factors, including the formation of passive film known as solid electrolyte interface (SEI) layer over the surface of the negative electrode (anode), which is often generated by reaction products of anode material, electrolyte reduction, and/or lithium ion reduction. The SEI layer formation plays a significant role in determining electrode behavior and properties including cycle life, irreversible capacity loss, high current efficiency, and high rate capabilities, particularly advantageous for power battery and start-stop battery use. The electrode 100 further includes a negative electrode current collector (not shown), which may be formed from copper or any other appropriate electrically conductive material known to those of skill in the art. In conventional processes of forming electrodes, particles of active materials (e.g., 110) and electrically conductive filler material (e.g., 120) may be mixed with a binder (e.g., 130) and slurry cast onto a current collector. After a solid porous negative electrode (e.g., 100) is formed, it may be further imbibed with electrolyte.

In accordance with various aspects of the present disclosure, the negative electrode may include a negative electrode electroactive material comprising silicon. As noted above, anode active materials comprising silicon have been considered for high-performance applications (EVs/HEVs) due to their high specific capacity and energy density materials. In practice, however, conventional anode materials comprising silicon suffer from significant performance drawbacks. The present technology however addresses the issues found in conventional silicon-containing electrodes and provides high-performance silicon-containing anodes having advantageous electrochemical performance capabilities, as well as longevity for long-term use in rechargeable lithium-ion electrochemical cells. Thus, in accordance with certain aspects of the present disclosure, the negative electrode comprises an electroactive material that comprises silicon. Such a material may be silicon (capable of inserting lithium) or may be lithium-silicon and silicon containing binary and ternary alloys, such as Si—Sn, SiSnFe, SiSnAl, SiFeCo, silicon oxide (SiOx) and the like. In certain embodiments, the silicon containing material comprises or consists essentially of silicon (rather than an alloy of silicon).

The electroactive material comprising silicon may have a round geometry or an axial geometry and thus may be in the form of particles or in alternative variations, may be in the form of nanowires, nanorods, nanosprings, or hollow tubes. Such silicon structures can help accommodate the large volume changes that silicon undergoes during lithium cycling in a lithium ion battery. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry silicon-containing particles suitable for use in the present disclosure may have high aspect ratios, ranging from about 10 to about 5,000, for example. In certain variations, the silicon-containing particles having an axial-geometry include fibers, wires, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes. For generally round geometry silicon-containing particles, an average particle size diameter of a suitable silicon-containing particle may be greater than or equal to about 20 nm to less than or equal to about 100 μm, optionally greater than or equal to about 50 nm to less than or equal to about 20 μm, optionally greater than or equal to about 100 nm to less than or equal to about 10 μm, by way of non-limiting example.

Additionally, in certain embodiments, the negative electrode may further include an electrically conductive material, such as, for example, electrically conductive filler particles. Such electrically conductive material (e.g., electrically conductive filler particles) may have a round geometry or an axial geometry as described above. Suitable electrically conductive material is well known to those of skill in the art and includes carbon black, graphite, carbon fibers, and carbon nanotubes, by way of non-limiting example. Preferably, the electrically conductive particles and silicon-containing particles are well mixed into the polymeric binder for even distribution (e.g., homogeneous distribution) and therefore even electrical conductivity.

In various aspects, the inventive technology pertains to providing high performance, low capacity fade negative electrode materials comprising silicon and electrically conductive material. For example, the present disclosure contemplates an electrode material for an electrochemical cell comprising an electrode matrix having an electroactive material, an electrically conductive material and a polymeric binder, where the electroactive material and the electrically conductive are reacted to the binder. The electrode matrix thus defines a solid electrode material that is preferably porous. Depending on pore size, suitable porosities may range from greater than or equal to about 20% to less than or equal to about 80% porosity for an electrode (prior to being imbibed with any electrolyte).

In the past, polymeric electrode binders were not reacted with or chemically bonded to the electroactive materials and the electrically conductive material dispersed therein. In various aspects of the present disclosure, however, the electroactive material and the electrically conductive material are advantageously chemically bonded to the polymer binder to provide strong interfacial adhesion. Thus, an electroactive material comprising silicon has a functionalized surface (e.g., a first functionalized surface) and/or the electrically conductive material has a functionalized surface (e.g., a second functionalized surface) in accordance with the present teachings. The functionalized surfaces (e.g., first functionalized surface, second functionalized surface) may be created by reaction of the silicon-containing active material (e.g., silicon particles) and/or the electrically conductive material (e.g., carbon nanotube) with a silane having an organic reactive functional group, an oxidizing agent, dianhydride and/or a diamine. For example, the functionalized surface (e.g., first functionalized surface) of the electroactive material may comprise a first reactive group selected from the group consisting of an amino group, a carboxyl group, an anhydride group and a combination thereof. In certain variations, the functionalized surface (e.g., first functionalized surface) of the electroactive material may comprise a first reactive group selected from the group consisting of an amino group, a carboxyl group, and an anhydride group. Further, the functionalized surface (e.g., first functionalized surface) of the electrically conductive material may comprise a second reactive group selected from the group consisting of an amino group, a carboxyl group, and a combination thereof. In certain variations, the functionalized surface (e.g., first functionalized surface) of the electrically conductive material may comprise a second reactive group selected from the group consisting of an amino group and a carboxyl group. The functionalized surfaces (e.g., first functionalized surface, second functionalized surface) may be created by treatment with an organofunctional silane having such reactive groups (e.g., an amino group,), an oxidizing agent (e.g., nitric acid, sulfuric acid), dianhydride or a diamine.

Thus, in various aspects, the present disclosure provides a method of making a negative electrode for an electrochemical cell. The method may include admixing at least one binder precursor with an electroactive material comprising silicon and an electrically conductive material. The at least one binder precursor, the electroactive material and the electrically conductive material may be admixed in any suitable order. For example, the electroactive material and the electrically conductive material may be admixed together to form a mixture and then the at least one binder precursor may admixed with the mixture or the electroactive material, the electrically conductive material and the binder precursor may be admixed substantially simultaneously. The electroactive material may have a first surface functionalized with at least one reactive group (e.g., a first reactive group) selected from the group consisting of an amino group, a carboxyl group, an anhydride group and a combination thereof. Additionally, the electrically conductive material may have a second surface functionalized with at least one reactive group (e.g., a second reactive group) selected from the group consisting of an amino group, a carboxyl group, and a combination thereof.

The binder precursor may be selected or prepared so that it includes at least one functional group that can react with the at least one reactive group (e.g., first reactive group) on the functionalized first surface of the electroactive material comprising silicon and/or with the at least one reactive group (e.g., second reactive group) on the functionalized second surface of the electrically conductive material. In particular, the binder precursor reactive group (e.g., third reactive group) may be an anhydride group. For example, the at least one binder precursor is a polyamic acid having anhydride or amino end groups. Additionally or alternative, the at least one binder precursor may be a reaction product of a dianhydride with a diamine that forms poly(amic acid), which has a higher solubility in solvents and thus greater ability for ease of processing. Any suitable dianhydride may be used, for example, 3,3',4,4'-biphenyltetracarboxylic dianhydride, pyromellitic dianhydride, and a combination thereof. Suitable diamines include, but are not limited to phenyl-containing diamines. The phenyl-containing diamines can include one or more phenyl groups, which may be optionally substituted with at least one $C_1$-$C_5$-alkyl group (e.g., methyl, ethyl, propyl, butyl, pentyl). Additionally, if two or more phenyl-containing groups are present, they may be connected via a bond, an oxygen-containing bridging group (e.g., oxygen, a carbonyl group) or a $C_1$-$C_5$-alkyl group. Examples of suitable diamines include, but are not limited to 1,4-phenylenediamine, 4,4'-diaminodiphenyl ether, 1,3-phenylenediamine, 4,4'-diaminobiphenyl, bis(4-aminophenyl)methanone, and combinations thereof. In particular, the diamine may be 1,4-phenylenediamine, 1,3-phenylenediamine, and 4,4'-diaminobiphenyl.

The dianhydride and the diamine may be admixed with the functionalized electroactive material and the functionalized electrically conductive material in any suitable order. For example, the dianhydride and the diamine may be admixed together to form the binder precursor (e.g., polyamic acid), which is then admixed with the functionalized electroactive material and the functionalized electrically conductive material. Alternatively, the dianhydride, the diamine, the functionalized electroactive material and the functionalized electrically conductive material may be admixed together. In a particular embodiment, a functionalized electroactive material comprising an amino group may be admixed with a functionalized electrically conductive material comprising an amino group followed by addition of a diamine as described herein and a dianhydride as described herein. In another embodiment, a functionalized electroactive material comprising a carboxyl group and/or an anhydride group may be admixed with a functionalized electrically conductive material comprising a carboxyl group followed by addition of a dianhydride as described herein and a diamine as described herein.

In other aspects, the electroactive material comprises silicon and graphite. In various aspects, the graphite may have a fourth surface functionalized with at least one reactive group (e.g., a fourth reactive group) selected from the group consisting of an amino group, a carboxyl group, and a combination thereof. The electroactive material may comprise silicon in amount of at least about 5 wt. %, at least about 10 wt. %, at least about 20 wt. %, at least about 30 wt. %, at least about 40 wt. %, at least about 50 wt. % or at least about 60 wt. %, and graphite in amount of at least about 40 wt. %, at least about 50 wt. %, at least about 60 wt. %, at least about 70 wt. %, at least about 80 wt. %, at least about 90 wt. %, or at least about 95 wt. %. In particular, the electroactive material may comprise about 30 wt. % silicon and about 70 wt. % graphite. In another embodiment, the electroactive material may comprise about 5 wt. % to 60 wt. %, about 10 wt. % to about 50 wt. %, or about 20 wt. % to about 40 wt. % silicon and about 40 wt. % to about 95 wt. %, about 50 wt. % to about 90 wt. %, about 60 wt. % to about 80 wt. % graphite, particularly, about 10 wt. % to about 50 wt. % silicon and about 50 wt. % to about 90 wt. % graphite.

After being combined with the electroactive negative electrode material and the electrically conductive material, the at least one binder precursor thus reacts with the at least one reactive group (e.g., first reactive group, fourth reactive group) on the electroactive negative electrode material and the at least one reactive group (e.g., second reactive group) on the electrically conductive material to form a porous solid electrode material. In various aspects, the method may further comprise, after admixing the at least one binder precursor, the functionalized electroactive material and the functionalized electrically conductive material to form a slurry or a mixture, volatilizing or heating the slurry or mixture to form the negative composite electrode. For example, the slurry or mixture can be coated on a collector and then heated or volatilized to remove the solvent at a temperature of between about 60° C. to about 120° C. followed by further heating at a temperature of between about 200° C. to about 500° C. to form the polymeric binder. In certain instances, where the binder precursor is polyamic acid, the mixture or slurry can be heated as described to form polyimide having an imidization degree of at least about 95%, at least about 97% or at least about 99%. The negative composite electrode thus comprises the porous solid electrode material, including an electrode matrix where binder is reacted with both the electroactive material comprising silicon and the electrically conductive material, which are thus advantageously adhered thereto.

In accordance with various aspects of the present teachings, a polymeric binder is chemically attached to the functionalized surface of the silicon-containing particles, optionally the functionalized surface of graphite (as present in the electroactive material), and the functionalized surface of the electrically conductive material (e.g., carbon nanotubes) through reaction between amino groups and anhydride groups or amino groups and carboxyl groups to improve the battery cycling performance. The polymeric binder thus functions as both a surface coating for the silicon-containing particles and as a binder to physically retain the silicon-containing particles and the electrically conductive material (e.g., carbon nanotubes) within a matrix of the solid electrode material.

Such a solid electrode material comprising the binder reacted with the electroactive material (e.g., silicon-containing particles) and the electrically conductive material (e.g., carbon nanotubes) reduces mechanical degradation from volume expansion/contraction during Li-ion insertion/extraction by retaining the electroactive material (e.g., silicon-containing particles) and the electrically conductive material (e.g., carbon nanotubes) in proximity to other electrode components. In accordance with the present teachings, the functionalized surface of the silicon-containing particles and the functionalize surface of the electrically conductive material (e.g., carbon nanotubes) further reacted with a binder precursor helps to retain the position of the negative electrode components within the matrix and thus helps resolve the problem of structural and mechanical separation in a silicon-containing anode material during Li-ion insertion/extraction.

In certain aspects, the present disclosure contemplates functionalizing an electroactive material comprising silicon by grafting or reacting a material comprising silicon, such as a silicon particle, with an organofunctional silane. In other aspects, the electroactive material comprising silicon may be procured with a functionalized surface as described above and then admixed with the electrically conductive material with a functionalized surface as described above and a binder precursor (which itself is selected or prepared to have one or more reactive functional groups that will react with the functionalized electroactive material and the functionalized electrically conductive material).

While various silanes may be used to functionalize the surface of the silicon-containing electroactive material with the reactive functional groups, a representative structure for a suitable organofunctional silane is set forth in Formula I:

$$(R^1)_n\text{—Si}(R^2)_a(R^3)_b(R^4)_c \qquad (I),$$

where $R^1$, $R^2$, $R^3$, and $R^4$ are ligands of the Si. In Formula I, a-c are 0 or 1, preferably a-c are 1, and n+a+b+c=4. $R^1$ comprises an organofunctional group. The organofunctional group may be selected from the group consisting of amino or amine groups, carboxyl groups, hydroxyl group, and the like. An amino organofunctional group may be selected from the group consisting of amino groups, including primary and secondary amines. Such functional groups may be provided as independent ligands or further incorporated or substituted into a hydrocarbon, so long as the functional group remains reactive.

Ligands $R^2$, $R^3$, and $R^4$ are independently selected from one another and may contain one or more heteroatoms comprising oxygen, nitrogen, sulfur or phosphorus. In certain variations, $R^2$, $R^3$, and $R^4$ are hydrolysable groups. $R^2$, $R^3$, and $R^4$ preferably have an oxygen group, —O—Y, where Y may be a straight or branched, saturated or unsaturated alkyl, alkenyl, cycloalkyl, or aryl group having 1 to 30 carbon atoms, optionally 1 to 20 carbon atoms, and in certain variations, 1 to 10 carbon atoms, where $R^1$ thus forms an alkoxy, aryloxy, or carboxyl group. Thus, $R^2$, $R^3$, and $R^4$ may contain an oxygen group bonded to the silicon (Si—O—Y) and may be selected from the group consisting of: hydroxyl, methoxy, ethoxy, methoxy, ethoxy, propoxy, isopropoxy, butoxy, isobutoxy, tert-butoxy, pentyloxy, tert-pentyloxy, neo-pentyloxy, hexyloxy, isohexyloxy, aryloxy, phenoxy, tolyloxy, xylyloxy, and the like. Selection of the ligands ($R^1$-$R^4$) may be tailored to the particular electrode components, including binder, in which the silicon-containing electroactive material is to be used.

In other aspects, the electroactive negative electrode material may be functionalized by reacting a silicon particle with a silane comprising an amino reactive group. For example, suitable aminosilanes may include $R^1$ having an amino group, such as a primary amino group, and $R^2$-$R^4$ comprising an alkoxy group. In certain variations, the aminosilane may comprise an aminoalkyltrialkoxy silane, such as γ-aminopropyltriethoxy silane, aminopropyltrimethoxy silane, aminopropylmethyldiethoxy silane, aminopropylmethyldimethoxy silane, each having an amino reactive group.

In other aspects, the electroactive negative electrode material may be functionalized by reacting a silicon particle with an aminosilane as described herein to form amino reactive groups on the surface of the electroactive negative electrode material. The amino functionalized electroactive material may be further reacted with a dianhydride as described herein to form anhydride reactive groups on the surface.

In other variations, the electroactive negative electrode material may be functionalized by hydrolyzing a silicon particle with anhydride reactive groups to form carboxyl groups on the surface. For example, the silicon particle may be functionalized with anhydride reactive groups as described above and further reacted with water or exposed to humid air to form carboxyl reactive groups on the surface.

In certain aspects, the silicon-containing electroactive materials may be reacted or oxidized to form hydroxyl groups on the silicon-containing particles prior to functionalization of the surface. For example, the silicon-containing particles may be exposed to oxygen and/or water to form hydroxyl groups on the silicon-containing particles to form, e.g., silanol groups. Alternatively, such a further reaction or oxidization step may not be necessary as silicon-containing particles may be procured having such hydroxyl groups present.

In certain aspects, the present disclosure also contemplates functionalizing an electrically conductive material as described herein by grafting or reacting a carbon containing material (electrically conductive material), such as carbon black, graphite, a carbon fiber and/or a carbon nanotube, with an oxidizing agent or a diamine. In other aspects, the electrically conductive material may be procured with a functionalized surface as described above and then admixed with the electroactive material with a functionalized surface as described above and a binder precursor (which itself is selected or prepared to have one or more reactive functional groups that will react with the functionalized electroactive material and the functionalized electrically conductive material).

Thus, in other aspects, the electrically conductive material may be functionalized by reacting a surface (e.g., second surface) of the electrically conductive material with an oxidizing agent to form at least one reactive group (e.g., second reactive group) on the electrically conductive material. In particular, a carboxyl group is the second reactive group. Any suitable oxidizing agent may be used, such as acids, salts, peroxides, oxygen, water and combinations thereof. Examples of oxidizing agents include, but are not limited to nitric acid ($HNO_3$), sulfuric acid ($H_2SO_4$), hydrogen peroxide ($H_2O_2$), potassium permanganate ($KMnO_4$), potassium dichromate ($K_2Cr_2O_7$), oxygen ($O_2$), water ($H_2O$) and a combination thereof. Examples of combinations of oxidizing agents include, but are not limited to nitric acid and sulfuric acid, hydrogen peroxide and sulfuric acid, potassium permanganate and sulfuric acid, potassium dichromate and sulfuric acid, and oxygen and water.

Additionally, the electrically conductive material may be functionalized by reacting a surface (e.g., second surface) of the electrically conductive material with a diamine to form an amino group as the least one reactive group (e.g., second reactive group) on the electrically conductive material. In particular, when the electrically conductive material comprise a carboxyl group, the electrically conductive material may then be further reacted with thionyl chloride ($SOCl_2$) and/or a diamine as described herein (e.g., 1,4-phenylenediamine, 4,4'-diaminodiphenyl ether, 1,3-phenylenediamine, 4,4'-diaminobiphenyl, bis(4-aminophenyl)methanone, and combinations thereof).

Such functionalized silicon-containing electroactive materials and functionalized electrically conductive materials may then be used in accordance with the present teachings to form an improved high-performance negative electrode for use in a lithium-ion electrochemical cell. FIG. 3 shows a representative schematic of an exemplary process 200 for creating the electrode materials according to certain aspects of the present teachings. A functionalized electroactive material precursor 210 has silicon-containing particles 212 with a plurality of reactive functional groups 220 on a surface thereof. A functionalized electrically conductive material precursor 230 has conductive particles 232 with a second plurality of reactive functional groups 240 on a surface thereof. A binder precursor 250 comprises one or more polymeric binder precursor 242 (notably, the polymeric binder precursor may be a polymer, monomer, oligomer, or the like) having a third plurality of reactive groups 260. The one or more polymeric binder precursor 242 may be the same or different. After the functionalized electroactive material precursor 210, the functionalized electrically conductive material 230 and binder precursor 250 are admixed together, a reaction occurs between the plurality of reactive functional groups 220, the second plurality of reactive functional groups 240 and the third plurality of reactive groups 260 to form a porous solid electrode material 270. The porous solid electrode material 270 includes the silicon-containing particles 212 and the conductive particles 232, which are both attached via chemical bonds to a polymeric binder 252, which physically binds and retains the silicon-containing particles 212 and the conductive particles 232 within the electrode and minimizes and/or prevents physical separation and breaking of electrical contacts and continuity in the electrode during lithium cycling.

In one variation of the present teachings, the plurality of reactive functional groups 220 are amino groups on the silicon-containing particle 212 and the second plurality of reactive functional groups 240 are amino groups on the conductive particles 232. In such a variation, the binder precursor 250 may be a reaction product of a dianhydride with a diamine that forms poly(amic acid), which has a higher solubility in solvents and thus greater ability for ease of processing. The binder precursor 250 thus has reactive groups 260 in the form of an anhydride. The binder precursor 250 anhydride reactive group 260 thus reacts with the amino reactive groups 220 on the functionalized surface of the silicon-containing particle 212 and the amino reactive groups 240 on the functionalized surface of the conductive particles 232 to form the porous electrode matrix 270. The polymeric binder 252 thus formed is polyimide upon heat treatment (such as at 250° C. under vacuum conditions for 12 hours). Like the embodiment above, the polyimide polymeric binder 252 serves as a physical binder and also behaves as a coating on the surface of the silicon-containing particles 212.

In another variation of the present teachings, the plurality of reactive functional groups 220 are carboxyl groups and/or anhydride groups on the silicon-containing particle 212 and the second plurality of reactive functional groups 240 are carboxyl groups on the conductive particles 232. In such a variation, the binder precursor 250 may be a reaction product of a dianhydride with a diamine that forms poly(amic acid), which has a higher solubility in solvents and thus greater ability for ease of processing. The binder precursor 250 thus has reactive groups 260 in the form of an amino. The binder precursor 250 amino reactive group 260 thus reacts with the carboxyl reactive groups and/or anhydride reactive groups 220 on the functionalized surface of the silicon-containing particle 212 and the carboxyl reactive groups 240 on the functionalized surface of the conductive particles 232 to form the porous electrode matrix 270. The polymeric binder 252 thus formed is polyimide upon heat treatment (such as at 250° C. under vacuum conditions for 12 hours). Like the embodiment above, the polyimide polymeric binder 252 serves as a physical binder and also behaves as a coating on the surface of the silicon-containing particles 212.

Thus, the present disclosure contemplates a negative electrode for an electrochemical cell comprising a solid electrode material. The solid electrode material is porous in preferred variations. The solid electrode material comprises an electroactive material comprising silicon having a first functionalized surface bonded or attached to a binder and an electrically conductive material having a second functionalized surface bonded or attached to the binder. In certain aspects, the first functionalized surface comprises at least one reactive group (e.g., a first reactive group) selected from the group consisting of an amino group, a carboxyl group, an anhydride group and a combination thereof and/or the second functionalized surface comprises at least one reactive group (e.g., a second reactive group) selected from the group consisting of an amino group, a carboxyl group. In certain aspects, the functionalized surface further comprises a silane having the reactive group. Additionally or alternatively, the electroactive material can further comprise graphite as described herein having a fourth surface functionalized with a fourth reactive group selected from the group consisting of an amino group, a carboxyl group, and a combination thereof. The electroactive material may comprise silicon and graphite in the amounts as described herein (e.g., about 10 wt. % to about 50 wt. % silicon and about 50 wt. % to about 90 wt. % graphite).

The first reactive group and optionally, the fourth reactive group on the electroactive material and the second reactive group on the electrically conductive material react with and form a bond with at least one reactive group (e.g., a third reactive group) in the polymeric binder. For example, where the functionalized surface reactive groups (e.g., first reactive group and second reactive) on the electroactive material and the electrically conductive material are an amino group, a carboxyl group, and/or an anhydride group, they can be reacted with and bond to an anhydride reactive group or amino reactive group of the polymeric binder.

In various aspects, the polymeric binder may be polyimide (PI). As discussed above, the polymeric binder desirably has at least one additional functional group that is capable of reacting with the functionalized first surface reactive group of the electroactive material comprising silicon, and optionally, the functionalized fourth surface reactive group of graphite (as present in the electroactive material), as well as the functionalized second surface reactive group of the electrically conductive material. In certain exemplary aspects, the functional group(s) on the polymeric binder may be selected from the group consisting of: an amine group, an anhydride group, and combinations thereof. Such binder functional groups can react with the functionalized silicon particle having a first reactive group and optionally, the functionalized graphite having a fourth reactive group (as present in the electroactive material) as well as the functionalized electrically conductive material having a second reactive group. For example, a polyimide precursor having anhydride groups (e.g., an anhydride, a dianhydride) and/or a polyimide precursor having amino groups (e.g., a diamine) can react with amine groups, carboxyl groups, and/or anhydride groups on a functionalized first surface of an electroactive material comprising silicon and optionally, amine groups and/or carboxyl groups on a functionalized fourth surface of graphite as well as amine groups and/or carboxyl groups on a functionalized second surface of an electrically conductive material. In particular, the first functionalize surface and the second functionalized surface are bonded to a polymeric binder comprising polyimide formed from at least one binder precursor comprising at least a third reactive group comprising an anhydride group (e.g., an anhydride, a dianhydride) and/or an amino group (e.g., a diamine).

The mixture of binder precursor, functionalized silicon-containing electroactive material, and functionalized electrically conductive material can be blended or mixed by equipment known in the art, such as for example, magnetic stirrers, mixers, kneaders, and the like. In certain preferred aspects, the mixture of binder precursor, functionalized silicon-containing electroactive material, and functionalized electrically conductive material is dispersed in one or more solvents or one or more vehicles. Additionally or alternatively, the functionalized silicon-containing electroactive material, and functionalized electrically conductive material is dispersed in one or more solvents or one or more vehicles followed by addition of the binder precursor. Non-limiting examples of suitable solvents include water, methanol, acetone, ethanol, N-methyl-2-pyrrolidone (NMP), dimethylformamide (DMF), and combinations thereof. The method may further comprise volatilizing the solvent to form the porous solid electrode material.

The handling and flowability of a mixture of binder precursor, functionalized silicon-containing electroactive material, and functionalized electrically conductive material is dependent on the viscosity of the polymer or polymer precursor selected, the viscosity of the solvent/carriers, as well as a rate of crosslinking (e.g., once a catalyst is added that affects the viscosity of the mixture).

A concentration of functionalized silicon-containing electroactive material in the negative electrode may optionally range from greater than or equal to about 20 mass % to less than or equal to about 95 mass % of the total mass of the negative electrode. As appreciated by those of skill in the art, the concentration of functionalized silicon-containing electroactive material required varies depending on particle size and the like. For electroactive particles comprising silicon that are nanoparticles (having an average particle size of less than or equal to about 1 μm), an amount of such nanoparticles may range from about greater than or equal to about 20 mass % to less than or equal to about 90 mass % of the total mass of the negative electrode. For electroactive particles comprising silicon that are microparticles, a concentration may range from greater than or equal to about 50 mass % to less than or equal to about 95 mass % of the total mass of the negative electrode.

A concentration of functionalized electrically conductive material in the negative electrode may be correlated to a percolation threshold, which varies with particle size, particle resistivity or conductivity, and geometry or particle shape, as recognized by those of skill in the art. In certain variations, a concentration of functionalized electrically conductive material in the negative electrode can range from greater than or equal to about 5 mass % to less than or equal to about 30 mass % of the total mass of the negative electrode.

An amount of polymeric binder in the negative electrode may range from greater than or equal to about 2 mass % to less than or equal to about 50 mass % of the total mass of the negative electrode. Generally, the smaller the particle size of the silicon-containing electroactive material and/or electrically conductive particles, the greater the amount of polymeric binder that is used.

In a particular embodiment, the porous solid electrode material comprises the electroactive material at greater than or equal to about 20% by mass to less than or equal to about 95% by mass of the porous solid electrode material, the electrically conductive material at greater than or equal to about 5% by mass to less than or equal to about 30% by mass of the porous solid electrode material, and the polymeric binder is present at greater than or equal to about 2% by mass to less than or equal to about 50% by mass of the porous solid electrode material.

The inventive electrode matrices comprising silicon-containing electroactive materials according to certain aspects of the present disclosure are especially well-suited to minimizing or preventing mechanical stress and fracturing of negative electrodes comprising the silicon-containing electroactive materials and thus for enhancing capacity retention and reducing charge capacity decay to the levels described previously above. Therefore, the inventive electrode materials have certain advantages, like long term cycling stability, high current efficiency, and high rate capabilities. Such long term cycling stability, high current efficiency, and high rate capabilities are particularly advantageous for power battery and start-stop battery use.

Accordingly, silicon-based anodes created in accordance with the principles of the present disclosure desirably have less than or equal to about 40% charge capacity decay, optionally less than or equal to about 30% capacity decay, optionally less than or equal to about 25% capacity decay, optionally less than or equal to about 20% capacity decay, and in certain high performing silicon-based anodes, capacity decay is less than or equal to about 15%. Hence, in certain variations, the present disclosure provides new anodes comprising silicon electroactive materials that have less than or equal to about 10% of capacity decay.

For example embodiments, an anode comprising a silicon material can retain up to about 90% of charge capacity. Thus, with the inventive silicon-based anodes have a capacity retention up to about 90%.

EXAMPLES

General Methods

For the electrochemical performance characterization for Example 1 and Comparative Example 1: The Si/Li coin cells were assembled. The electrolyte used was 1M lithium hexafluorophosphate in ethylene carbonate and diethyl carbonate EC/DEC (1:2 v/v) containing 10 wt. % fluoroethylene carbonate and the separator was Celgard 2400. The coin cells were discharged to 0.01 V under a constant current-constant voltage mode, and then charged under a constant current mode to 1.0 V at C/10 at room temperature and 70 cycles were tested. A 5 min resting period was used between each charge-discharge cycle.

Example 1

Amino grafted carbon black particles were prepared by oxidizing carbon black (TIMREX® SUPER P® Li) with $HNO_3$ (0.3 M) at 95° C. for 6 hours to form a suspension. The suspension was centrifuged and the carbon was washed by resuspension with water. A reaction flask was charged with 15 g thionyl chloride ($SOCl_2$). Whilst stirring, 1 g oxidized carbon black was added. The flask openings were closed with stoppers and the reaction mixture was initially slowly heated whilst stirring in an oil bath up to 50° C. bath temperature and afterwards stirring was continued for 2 hours at 80° C. bath temperature. Carbon black with —COCl was then centrifuged out. The centrifuged carbon black with —COCl (5 g) was mixed with 5 g p-phenylenediamine, and reacted at room temperature (about 18° C. to about 25° C.) overnight (about 6 to about 12 hours) to form amino grafted carbon black particles. The amino grafted carbon black particles can be centrifuged out. Amino grafted silicon (Si) particles were prepared from Si particles having an average particle size diameter of 100 nm (obtained from MTI). The Si particles were dispersed in water at 60° C. for 2 hrs and were centrifuged out and dried. The treated Si particles were dispersed in 2% solution of 3-aminopropyltriethoxysilane in acetone, stirred at room temperature for 2 hours to form amino grafted silicon particles. The amino grafted silicon particles were centrifuged out.

The amino grafted carbon black particles (0.2 g) and the amino grafted silicon particles (0.6 g) were mixed by mortar and pestle for 20 min, and then dispersed in 5 g of NMP to form a mixture. 0.054 g of 1,4-phenylenediamine was added to the mixture until it was dissolved. 0.147 g of 3,3',4,4'-biphenyltetracarboxylic dianhydride was added under the protection of nitrogen. Reaction of the amino groups on carbon black and the amino groups on the silicon particles with the anhydride groups from 3,3',4,4'-biphenyltetracarboxylic dianhydride and the amino groups from 1,4-phenylenediamine took place overnight (about 6 to about 12 hours) at room temperature to form a slurry containing polyamic acid. Then, the slurry was cast on a copper foil to make the anode. The anode was further dried at 120° C. for 2 hours, and then cured at 350° C. under vacuum overnight to make the final anode that comprises the polymeric binder (20 mass %) reacted with functionalized silicon (60 mass %) and the functionalized carbon black particles (20 mass %).

The charging and discharging profiles of the electrochemical performance of Example 1 is shown in FIG. 4. In FIG. 4, y-axis capacity is in mAh/g units, while cycle number is shown on the x-axis. A charge rate of C/10 is used at room temperature and 70 cycles are tested. The cell is cycled between 0.1 V-1 V. Charge capacity on lithiation and discharge capacity on delithiation are shown. The first discharge capacity is about 3600 mAh/g. The first charge capacity is 2400 mAh/g. The Coulombic efficiency is thus about 67%. Based on cycle 10, the capacity retention at 50 cycles is about 97%.

Comparative Example 1

A binder (poly(3,3'4,4'-benzophenone tetracarboxylic dianhydride-co-20% methylphenylenediamine/80% toluenediamine) was dissolved in a solvent (NMP) to make a 3 wt. % binder solution. Silicon particles having an average particle size diameter of 100 nm (obtained from MTI) and carbon black (TIMREX® SUPER P® Li) were mixed using a mortar and a pestle to form a mixture. The mixture was dispersed in the binder solution (additional NMP can be added to adjust the viscosity) to make an electrode slurries. The electrode slurries were then coated on Cu foils, and dried at 60° C. overnight (about 6 to about 12 hours). The dried electrodes was further heat treated under vacuum at 250° C., 300° C. and 350° C. for 16 hr. to cure the polyimide binders. The electrodes comprise 60 wt. % silicon particles, 20 wt. % carbon black, and 20 wt. % binder.

The charging and discharging profiles of the electrochemical performance of Comparative Example 1 is shown in FIG. 5. In FIG. 5, y-axis capacity is in mAh/g units, while cycle number is shown on the x-axis. Based on cycle 10, the capacity retention at 50 cycles is about 78% for the electrode heated at 350° C. Accordingly, this Example 1 prepared in accordance with certain aspects of the present disclosure shows significantly improved cycling performance and reduced capacity fade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a negative electrode for an electrochemical cell, the method comprising:
admixing an electroactive material comprising silicon having a first surface functionalized with a first reactive group selected from the group consisting of an amino group, a carboxyl group, an anhydride group and a combination thereof; an electrically conductive material having a second surface functionalized with a second reactive group selected from the group consisting of an amino group, a carboxyl group and a combination thereof; and at least one binder precursor comprising a third reactive group selected from the group consisting of an amino group, an anhydride group and a combination thereof; and reacting the third reactive group on the at least one binder precursor with the first reactive group on the electroactive material and the second reactive group on the electrically conductive material to form a porous solid electrode material comprising a polymeric binder reacted with the electroactive material and the electrically conductive material to form the negative electrode.

2. The method of claim 1, wherein the polymeric binder is polyimide (PI).

3. The method of claim 1, wherein the at least one binder precursor is a polyamic acid having anhydride end groups.

4. The method of claim 1, wherein the electrically conductive material is selected from the group consisting of carbon black, graphite, carbon fibers, carbon nanotubes and a combination thereof.

5. The method of claim 1, wherein the electroactive material comprises about 10 wt. % to about 50 wt. % silicon and about 50 wt. % to about 90 wt. % graphite.

6. The method of claim 1 further comprising functionalizing the first surface of the electroactive material comprising silicon by reacting the first surface with a silane comprising the first reactive group.

7. The method of claim 6, wherein the first surface is reacted with:

an aminosilane and the aminosilane comprises γ-aminopropyltriethoxy silane, aminopropyltrimethoxy silane, aminopropylmethyldiethoxy silane, aminopropylmethyldimethoxy silane, and combinations thereof.

8. The method of claim 1 further comprising functionalizing the first surface of the electroactive material comprising silicon by reacting the first surface with an aminosilane and a dianhydride to form the anhydride as the first reactive group.

9. The method of claim 1 further comprising functionalizing the second surface of the electrically conductive material by reacting the second surface with an oxidizing agent to form the carboxyl group as the second reactive group, wherein the oxidizing agent is selected from the group consisting of nitric acid, sulfuric acid, hydrogen peroxide, potassium permanganate, potassium dichromate, oxygen, water and a combination thereof.

10. The method of claim 9 further comprising reacting the second surface of the electrically conductive material comprising the carboxyl group with a diamine to form the amino group as the second reactive group.

11. The method of claim 1 further comprising forming the binder precursor before the admixing, by reacting a diamine with a dianhydride to form a poly(amic acid) comprising the anhydride group and/or the amino group.

12. The method of claim 11, wherein the diamine is selected from the group consisting of 1,4-phenylenediamine, 4,4'-diaminodiphenyl ether, 1,3-phenylenediamine, 4,4'-diaminobiphenyl, bis(4-aminophenyl)methanone, and a combination thereof.

13. The method of claim 1, further comprising, after the admixing, applying the binder, the electroactive material and the electrically conductive material to a current collector so that the reacting proceeds to form the porous solid electrode material on the current collector.

14. The method of claim 1, wherein the electroactive material is present in the porous solid electrode material at greater than or equal to about 20% by mass to less than or equal to about 95% by mass of the porous solid electrode material, the electrically conductive material is present at greater than or equal to about 5% by mass to less than or equal to about 30% by mass of the porous solid electrode material, and the polymeric binder is present at greater than or equal to about 2% by mass to less than or equal to about 50% by mass of the porous solid electrode material.

15. The method of claim 1, wherein the admixing further comprises admixing a solvent with the binder precursor and the electroactive material comprising silicon, wherein the solvent is selected from the group consisting of: water, methanol, acetone, ethanol, N-methyl-2-pyrrolidone (NMP), dimethylformamide (DMF), and combinations thereof, and the method further comprises volatilizing the solvent to form the porous solid electrode material.

16. A method of making a negative electrode for an electrochemical cell, the method comprising:

admixing an (i) electroactive material comprising: silicon having a first surface functionalized with a first reactive group selected from the group consisting of an amino group, a carboxyl group, an anhydride group, and a combination thereof; and graphite having a fourth surface functionalized with a fourth reactive group selected from the group consisting of an amino group, a carboxyl group, and a combination thereof; (ii) an electrically conductive material having a second surface functionalized with a second reactive group selected from the group consisting of an amino group, a carboxyl group and a combination thereof; and (iii) at least one binder precursor comprising a third reactive group selected from the group consisting of an amino group, an anhydride group and a combination thereof; and reacting the third reactive group on the at least one binder precursor with the first reactive group on the electroactive material and the second reactive group on the electrically conductive material to form a porous solid electrode material comprising a polymeric binder reacted with the electroactive material and the electrically conductive material to form the negative electrode.

* * * * *